Fig 12.

Patented Jan. 15, 1935

1,987,908

UNITED STATES PATENT OFFICE 1,987,908

AUTOMATIC TIRE VULCANIZING MOLD

Charles Edgar Maynard, Northampton, Mass., assignor, by mesne assignments, to The Fisk Rubber Corporation, a corporation of Delaware Application October 15, 1929, Serial No. 399,754

29 Claims. (Cl. 18—17)

My invention relates to vulcanizing molds and more particularly to a mold for vulcanizing pneumatic tire casings.

Tire casings are cured under a substantial internal fluid pressure which must be resisted by the means which hold the mold sections closed during the curing operation and where the fluid which applies this internal pressure is heated to act as a curing medium the danger from faulty closing, opening or locking of the mold members is increased.

For economy of operation the moving parts should be few and the opening and closing of the mold members must be accomplished in a relatively small space of time, preferably automatically. Furthermore, the mold members should be readily interchangeable. In the past it has been found necessary to make the mold supports relatively large and massive with a multiplicity of moving parts for the opening, closing and locking of the mold. The safety of the operation has to a large measure been dependent on the operator; opening and closing of the mold has consumed a relatively large amount of time; and substantial labor and time have been required in changing the mold members.

It is in general the object of my invention to overcome the above difficulties; to provide a vulcanizer of this type in which the weight of the moving parts may be reduced to a minimum; to so arrange the mold supporting, closing and locking members that their structure may be greatly simplified and the number of moving parts reduced; to make the operation of the mold automatic and independent of the human factor; and to simplify the changing of mold sizes. Due to the simplicity and ease of adjustment of the mold supporting members and a more efficient arrangement for circulating the curing medium I secure a greater uniformity of product. Other and further objects of my invention will be apparent from the following specification and claims.

In the accompanying drawings which illustrate one embodiment of my invention.

Figures 1, 2:
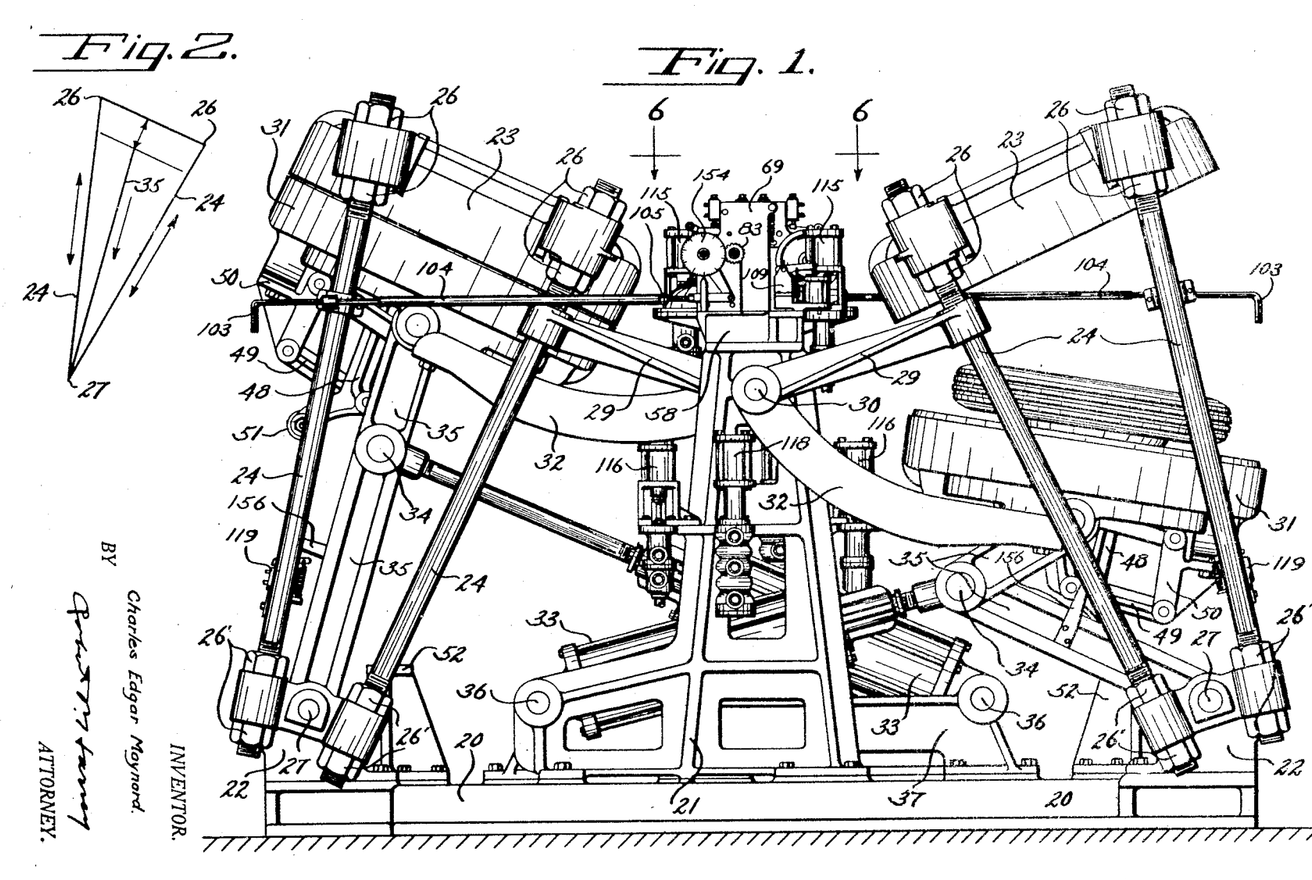
Fig. 1 is a side elevation of a double vulcanizing mold.
Fig. 2 is a diagram showing the direction of stress in certain members.

Referring particularly to Fig. 1 of the drawings, I provide a self-draining base plate 20 upon which are bolted spaced center frames 21, and end cross members 22. The vulcanizer as shown is double, that is, two molding and vulcanizing units are shown, one at each side of the center frame 21 which is common to both units. This arrangement has certain advantages which will later be pointed out. Each vulcanizing mold unit is exactly similar in construction and comprises an upper half which is held stationary and a movable lower half. The upper stationary mold half is secured, as later described, in a steam chamber 23 which is supported by four rods 24 passing through bosses 25 formed on the outer periphery of the steam chamber, nuts 26 adjustably securing the chamber 23 to the rods 24. The rods 24 on each side of the mold converge toward each other and are adjustably secured by nuts 26' in bosses 28 formed on the outer ends of the adjacent cross member 22.

The chamber 23 is held in an inclined position and the inner pair of rods 24 of each unit are connected by bracket arms 29 to shaft 30 carried by side frames 21.

The lower movable mold half is secured, as later described, in a lower movable steam chamber 31, secured to arms 32 pivoted on shaft 30. The lower mold and its associated parts are moved about pivot 30 to and from closed relation with the stationary mold half by means of an hydraulic cylinder 33, the piston rod of which is connected to the common pivot 34 of toggle levers 35 pivoted to the under side of chamber 31 and shaft 27 carried by an adjacent cross piece 22. The hydraulic cylinder 33 is pivoted at its closed end to a shaft 36 secured in side frames 21 and a central support 37 bolted to the base 20.

The specific arrangement for supporting and moving the mold members just described provides a very simple yet strong assembly. The rods 24 on each side of the mold member 23 form with the mold member substantially a triangle, an ideal rigid structure, and as illustrated in Fig. 2, the internal pressure in the tire being vulcanized which tends to separate the mold members is taken up as tension in the rods 24, the pressure against the upper mold member being taken directly by the rods and the pressure against the lower mold member being transmitted to the rods through toggle 35—35 and shaft 27. When the mold is closed the toggle pivot 34 is moved slightly beyond its dead center to lock the mold in closed position and no separate locking means is necessary. As will be later described the internal pressure cannot be applied until the toggle is at or beyond dead center so that the hydraulic pressure in cylinder 33 is never called on to oppose the pressure in the tire, thus the hydraulic pressure in cylinder 33 need not exceed that necessary to raise the lower mold member.

Figures 4, 5:
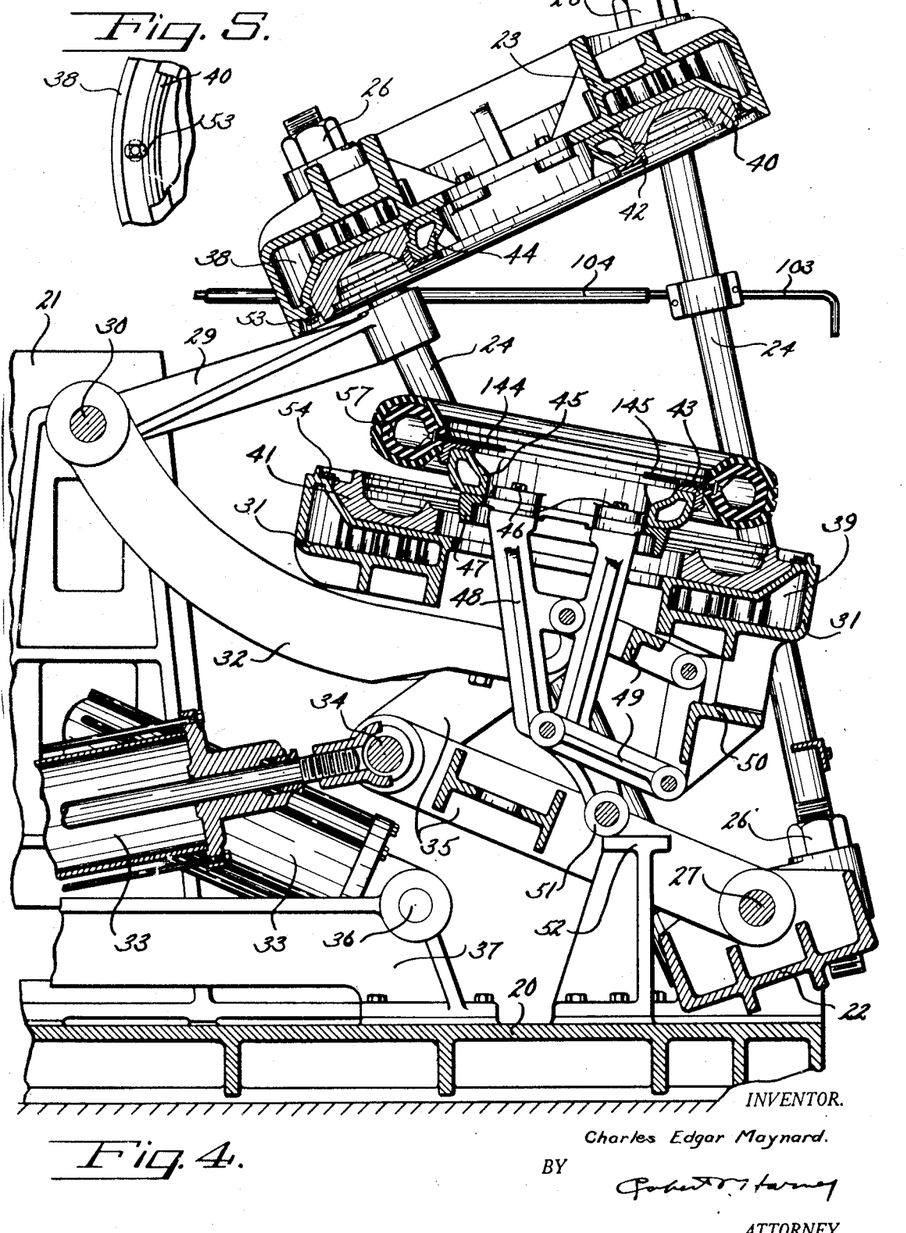
Fig. 4 is a sectional view on a larger scale of the right-hand half of the mold shown in Fig. 1.
Fig. 5 is a detail of one of the bolts for releasably holding one of the mold halves in place.

Referring to Fig. 4, the mold members 23 and 31 are chambered as at 38 and 39, respectively, for the circulation of steam or other heating fluid and are formed to receive respective mold halves 40 and 41. I have made bead rings 42 and 43 as separate members provided with separate respective steam chambers 44 and 45 formed integral with or secured to the rings, each ring being associated with its respective mold half. By making the bead rings separate from the mold halves proper I not only greatly simplify the casting of the mold members 23 and 31, thus materially decreasing the cost of manufacture, but I use the bead rings to perform other functions—in the case of the upper bead ring, to facilitate the changing or replacing of the molds and in the case of the lower bead ring to strip the cured tire from the mold and facilitate the placing of a raw tire in the mold.

Figure 3:
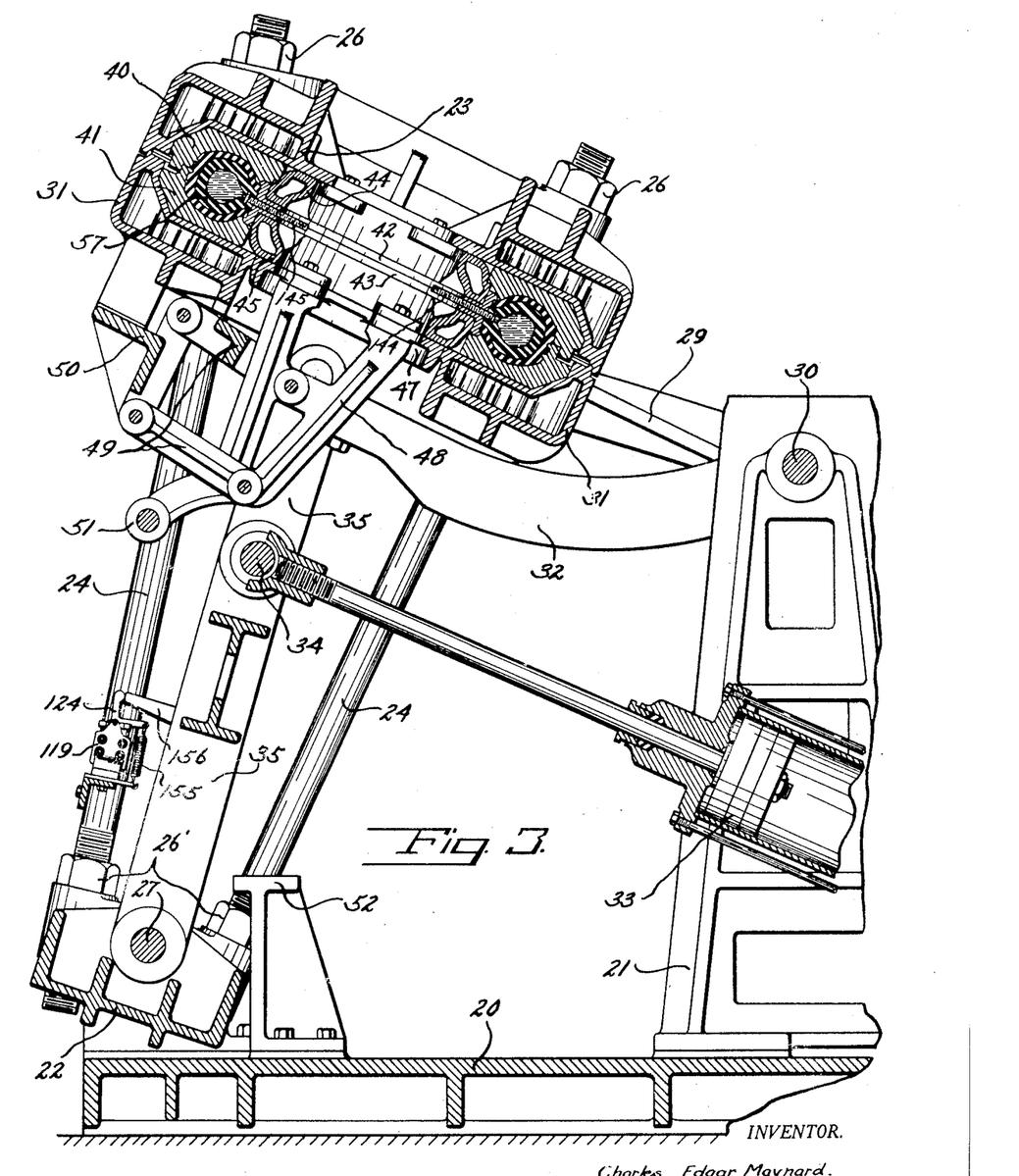
Fig. 3 is a sectional view on a larger scale of the left-hand half of the mold shown in Fig. 1.

The bead ring 43 with its steam chamber 45 is removably secured by bolts 46 to a supporting ring 47 provided with a downwardly extending bracket frame 48 pivoted by parallel links 49 to a bracket 50 carried by the lower mold member 31. Frame 48 is provided with roll 51 adapted, when the lower mold member is in lowered position as shown in Fig. 3, to engage a stop 52, bolted to the base 20, just before the lower mold member reaches its completely open position, thus arresting the further downward movement of the bead ring to strip the tire from the lower mold half. Since in practice it has been found that the tire will practically always adhere to the lower mold half if the upper mold and bead ring are well lubricated I have shown no positive ejecting means for the upper mold half, but such means may be provided (for example, spring-pressed pins in the upper bead ring) if desired. The elevated position of the lower bead ring when the vulcanizer is open facilitates the placing of the raw tires in the mold, assures its accurate positioning and since it is held out of contact with the lower half of the mold proper there is no danger of the over curing of the lower side wall of the tire if the closing of the mold is for any reason delayed.

The mold halves 40 and 41 are removably held in their respective steam chambers as by bolts 53 and 54 having one or both sides of their heads slabbed off so that when the head is turned to the dotted line position in Fig. 5 the molds can be removed from the steam chambers. Any other suitable securing means, such as slabbed washers held by conventional bolts may of course be used. The upper bead ring 42 and its steam chamber 44 is releasably secured to the upper steam chamber 23 as by bolts 55. The chamber portion 44 of the bead ring is formed with a shoulder 56 which engages a complementary shoulder formed on the upper mold half 40 so that as long as the bead ring is bolted in place the upper mold half is held in its steam cavity. This greatly facilitates the changing of the molds which is accomplished in the following manner. With the mold open, as shown in Fig. 3, the bolts 53 are turned to unlocked position, the upper mold being then held in position only by its bead ring; air is then admitted to cylinder 33 to close the mold as shown in Fig. 3; bolts 55 are now removed, completely releasing the upper mold half and its bead ring and upon returning the operating parts to open position, as shown in Fig. 4, the upper mold half comes down with the lower half; the lower bead ring and mold half are released by bolts 46 and 54 and the mold parts removed. The insertion of a mold is equally easy; the lower mold half and ring are laid in position and secured; the upper mold half and ring laid on top of the lower bead ring; the mold is then closed and the upper ring secured to chamber 23 by bolts 55; the mold is again opened, the upper mold half being in position in the upper chamber by its bead ring; the bolts 53 are then turned to securely lock the upper mold half into its steam chamber.

In the embodiment shown fluid pressure and heat are applied to the interior of the casing during the vulcanizing operation by means of an annular tube or "bag" 57 through which hot water under pressure is circulated. The operation of the mold is entirely automatic and automatically operating safety means are provided as will shortly be described which prevents admission of the hot water under pressure to the bag until the mold is completely closed and the toggle at or past dead center, and which also makes it impossible for either the operator or the automatic timing means to open the mold until the hot water is shut off and the pressure in the bag relieved.

Bolted to the top of the supports 21 is a plate 58 on which are mounted two timing and controlling units which are identical in construction, and both are driven from the same motor 59 and common reduction unit 60. By this arrangement the molds may be operated independently of each other.

Figure 6:
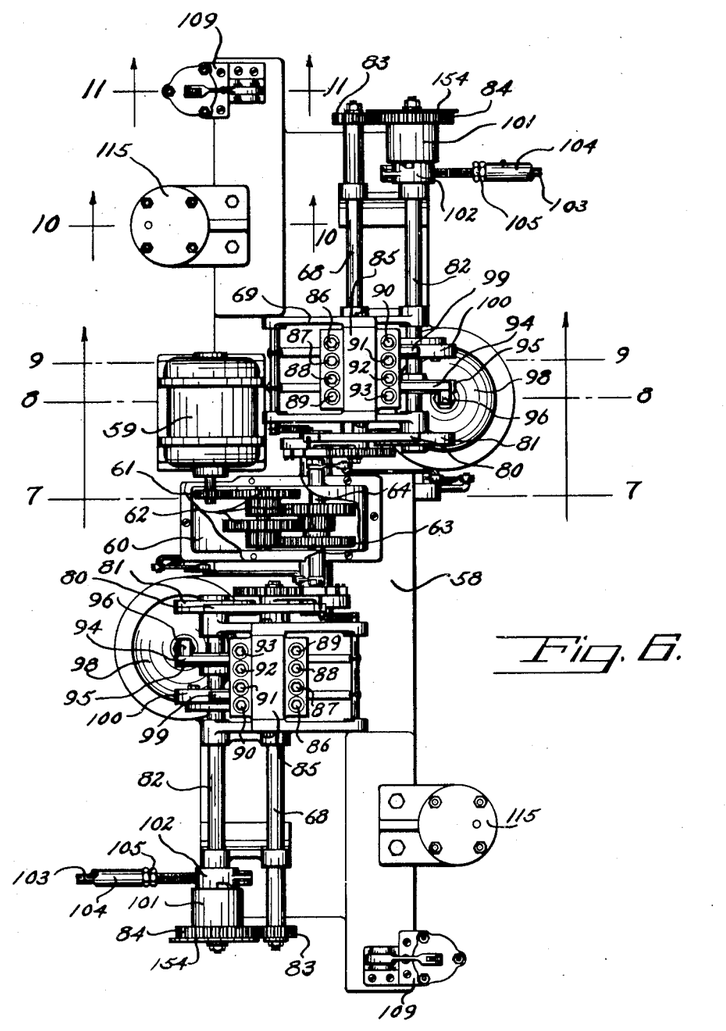
Fig. 6 is a plan view of the timing unit taken on line 6—6 of Fig. 1.
Figures 7, 8, 9, 10, 11:
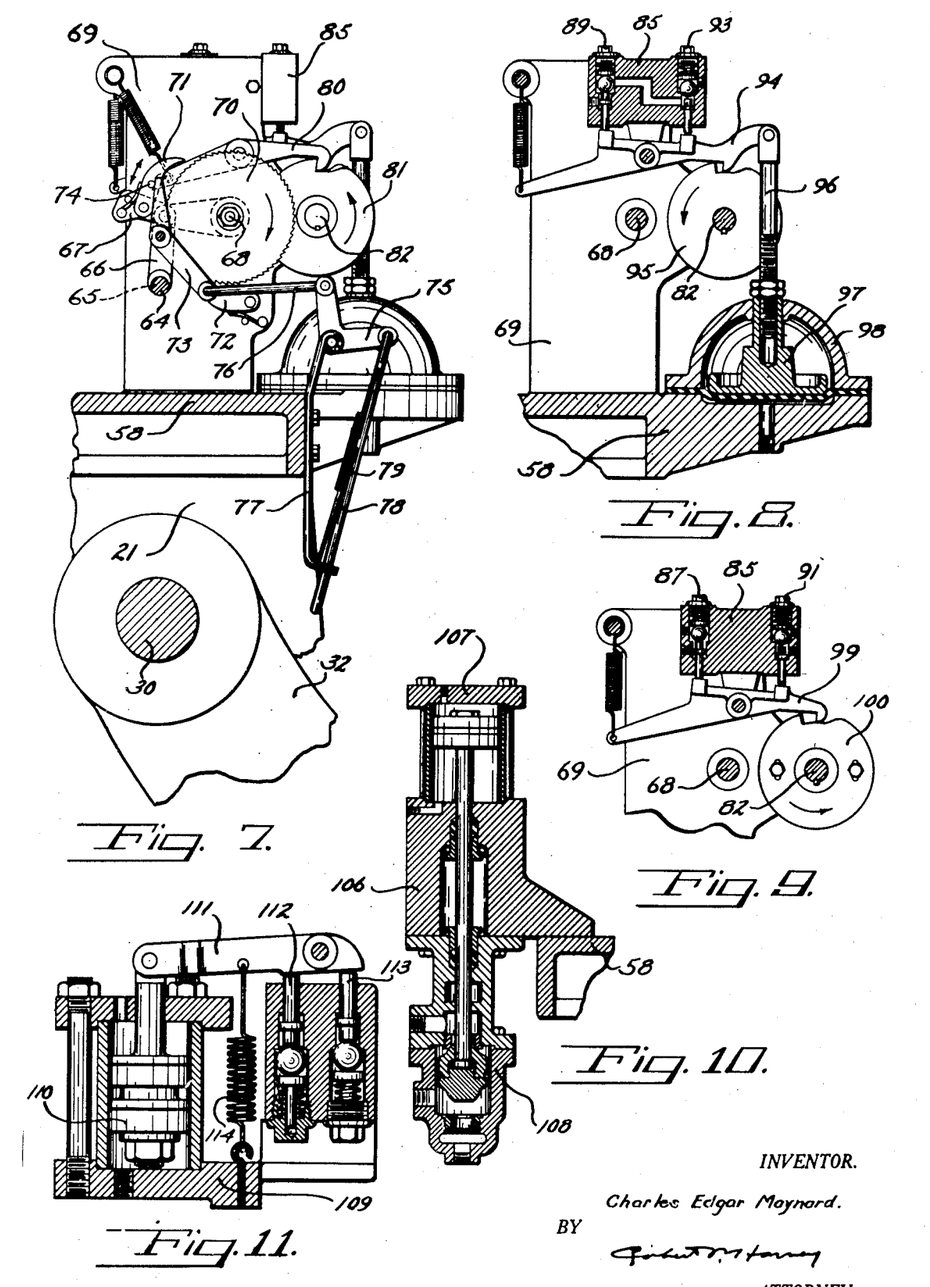
Fig. 7 is a sectional view taken on line 7—7 of Fig. 6.
Fig. 8 is a sectional view taken on line 8—8 of Fig. 6.
Fig. 9 is a sectional view taken on line 9—9 of Fig. 6.
Fig. 10 is a sectional view taken on line 10—10 of Fig. 6.
Fig. 11 is a sectional view taken on line 11—11 of Fig. 6.

As shown in Fig. 6, a pinion 61 on the motor 59 drives through reduction gears 62 of the reduction unit 60 a gear 63 keyed to a shaft 64 which extends from both sides of the reduction unit, and is formed on both ends with eccentrics 65 as best shown in Fig. 7. It may be noted at this point that in Fig. 6 all the parts in the lower unit corresponding to those in the upper unit bear the same character numbers and as they are identical in construction and operation I will describe only the upper unit which controls the mold shown on the right in Fig. 1.

Referring to Fig. 7, the eccentric 65 is connected by a link 66 to a pawl arm 67 freely mounted on a shaft 68 mounted in a supporting bracket 69. A ratchet wheel 70 is secured to the shaft 68 and a spring-pressed pawl 71 mounted on the pawl arm 67 is adapted to engage with it to index it in the direction indicated by the arrow, and an idler pawl 72 mounted on the bracket 69 also engages with it to prevent any backlash. The continuously rotating eccentric 65 serves to continuously oscillate the pawl arm 67, as indicated by the arrow. In order to control the indexing of the ratchet wheel 70 by the pawl 71, two separate means have been provided to hold the pawl away from the ratchet wheel. One arrangement comprises a bell crank 73 pivotally secured to the cover of the reduction unit 60 and, as shown, one arm engages a pin 74 in the pawl 71 while the other arm is connected to another bell crank 75 by a link 76. The bell crank 75 is pivotally mounted to a bracket 77, bolted to the plate 58 and is connected to a rod 78 and a tension spring 79. It will be noted that the end of the rod 78 is positioned to engage the arm 32 of the mold and when the latter is closed the rod 78 will be pushed up against the spring 79 and cause the bell crank 73 to leave the pin 74, thus leaving the pawl free to engage the ratchet wheel. The other arrangement comprises a spring-pressed lever 80 pivotally connected to the bracket 69 and engaging with a cam 81 mounted on a shaft 82 which is journaled in the bracket 69. As shown, the lever 80 is adapted to engage the pin 74 to hold the pawl away from the ratchet wheel when the cam 81 is in the position shown in Fig. 7.

As is best shown in Fig. 6, the shaft 68 extends beyond the bracket 69 and a pinion 83 mounted on its end drives a gear 84 mounted on the end of shaft 82 in the direction of the arrow in Fig. 7 when the ratchet wheel is rotated. A valve block 85 bolted to the bracket 69 is formed with eight valves 86, 87, 88, 89, 90, 91, 92 and 93, all of the same construction as shown in Figs. 8 and 9. A spring-pressed lever 94 pivotally mounted to the block 85 is positioned to engage the plungers of valves 88, 89, 92 and 93 and also a cam 95 mounted on the shaft 82, as best shown in Fig. 8. An adjustable link 96 connects the lever 94 to a plunger 97 of a diaphragm valve 98. As shown in Fig. 9, another spring-pressed lever 99 is pivotally mounted to the block 85 and engages valves 86, 87, 90 and 91 and a cam 100 mounted on the shaft 82. A pin clutch 101 is keyed to the shaft 82 adjacent the gear 84 and is adapted to be operated by a cam arm 102 connected to a rod 103 extending to the front of the mold. A sleeve 104 and lock nuts 105 on the rod serve to adjustably limit the forward movement of the rod, thus adjusting the extent that the arm 102 may rotate the clutch 101 and the shaft 82 when the handle of the rod 103 is pulled.

In Fig. 10 I have shown the type of control valve that I prefer to use with my mold. It comprises a built-up frame 106 with a double acting cylinder 107 at the top, the piston rod of which is integral with the plunger of a three-way valve 108 at the bottom. Fig. 11 shows the construction of a safety control valve 109 which comprises a single action cylinder 110 connected to a lever 111 adapted to operate valves 112 and 113. A spring 114 holds the lever in the position shown when no pressure exists in the cylinder, but upon introduction of pressure in the cylinder the spring is overcome and the lever reverses the positions of the valves. The valves 112 and 113 are ordinary ball valves as are the valves 86 to 93, inclusive.

Figure 12:
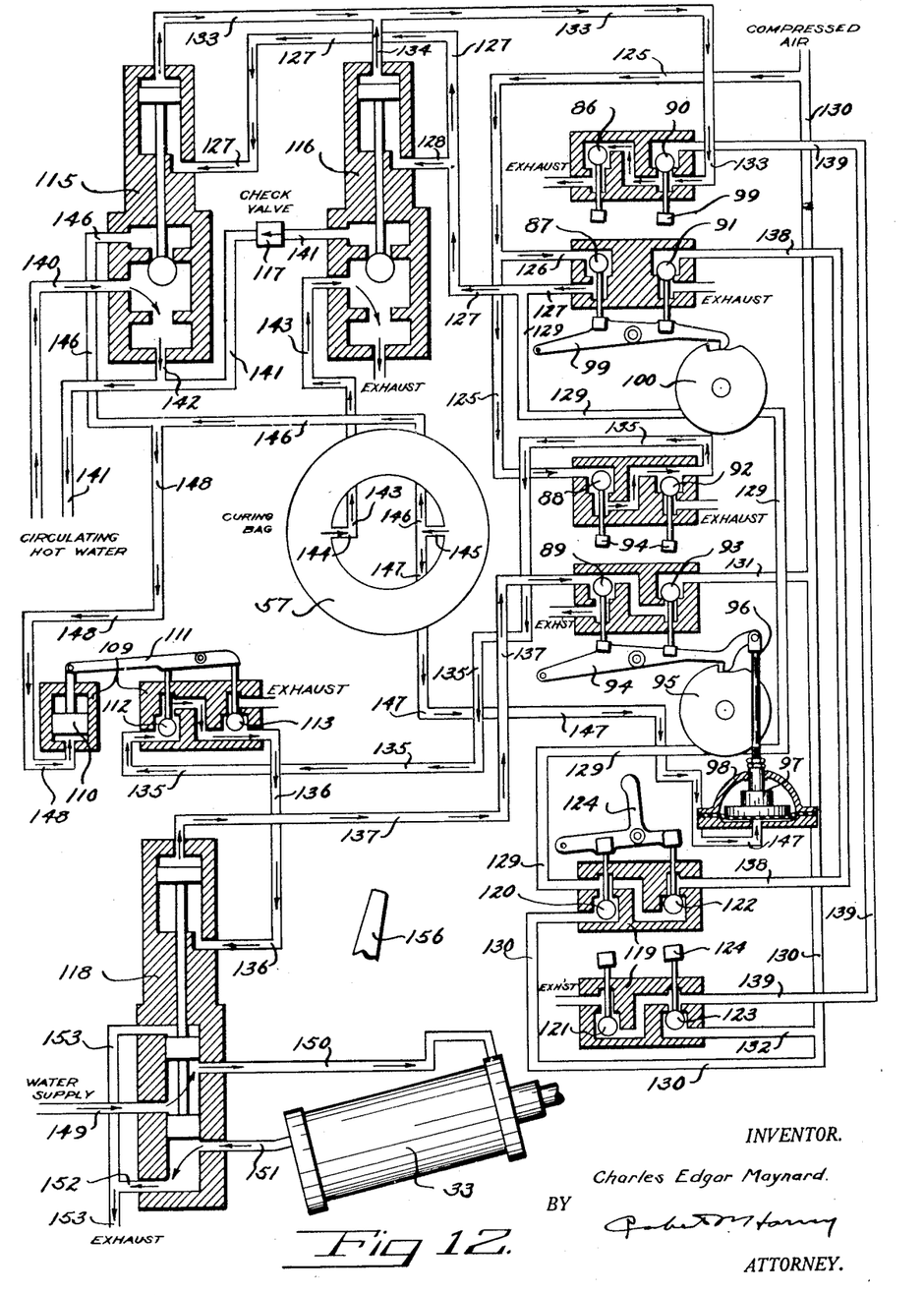
Figs. 12, 13, 14 and 15 are diagrammatic views showing the piping layout and the valve positions for the various molding operations.

For clearness I have not shown any of the piping in the drawings, but Figs. 12 to 15 show all the connections diagrammatically, and the position of the valves and parts shown in Fig. 12 corresponds to the position of the mold as shown in the right of Fig. 1. The parts that are used in the system comprise two air-operated valves 115 and 116 of the type shown in Fig. 10, one ordinary check valve 117, the valve block 85 with all its valves and associated controls, one safety control valve 109, one standard four-way valve 118 adapted to be operated by air, and a special lever valve comprising a block 119 in which is formed four valves 120, 121, 122 and 123 operated by a lever 124 which is held in one position by a spring 155, and when the mold closes an arm 156 bolted to the lower toggle link 35 engages an abutment on the lever 124 to reverse the valves from the position shown in Fig. 12 (see also Fig. 3).

To more completely describe the operating of the timing unit I have designated the pipe connections by character numbers 125 to 153, inclusive, and as indicated by the arrows in Fig. 12, valve 115 is kept in the up position by compressed air introduced from 125, 126, valve 87, and 127, while 133 is open to the exhaust by valves 90 and 86. Valve 116 is likewise held in the up position by air from 125, 126, valve 87, 127 and 128 and 134 is open to the exhaust by 133 and valves 90 and 86. Circulating hot water under pressure from any suitable source goes through 140 to valve 115 and returns through 142 and 141 back to the source. The back connection 144 of the curing bag 57 is open to the exhaust by 142 and valve 116. The front connection 145 is open to the safety valve 109 by 146 and 148 and also open to the diaphragm valve 98 by 147. Valve 118 is held in the up position by compressed air from 125, valves 88 and 92, 135, valves 112 and 113, and 136, while 137 is open to the exhaust through valve 89. The operating cylinder 33 holds the mold open by water introduced from 149, valve 118 and 150, while 151 is open to the exhaust through valve 118, 152 and 153.

Figure 13:
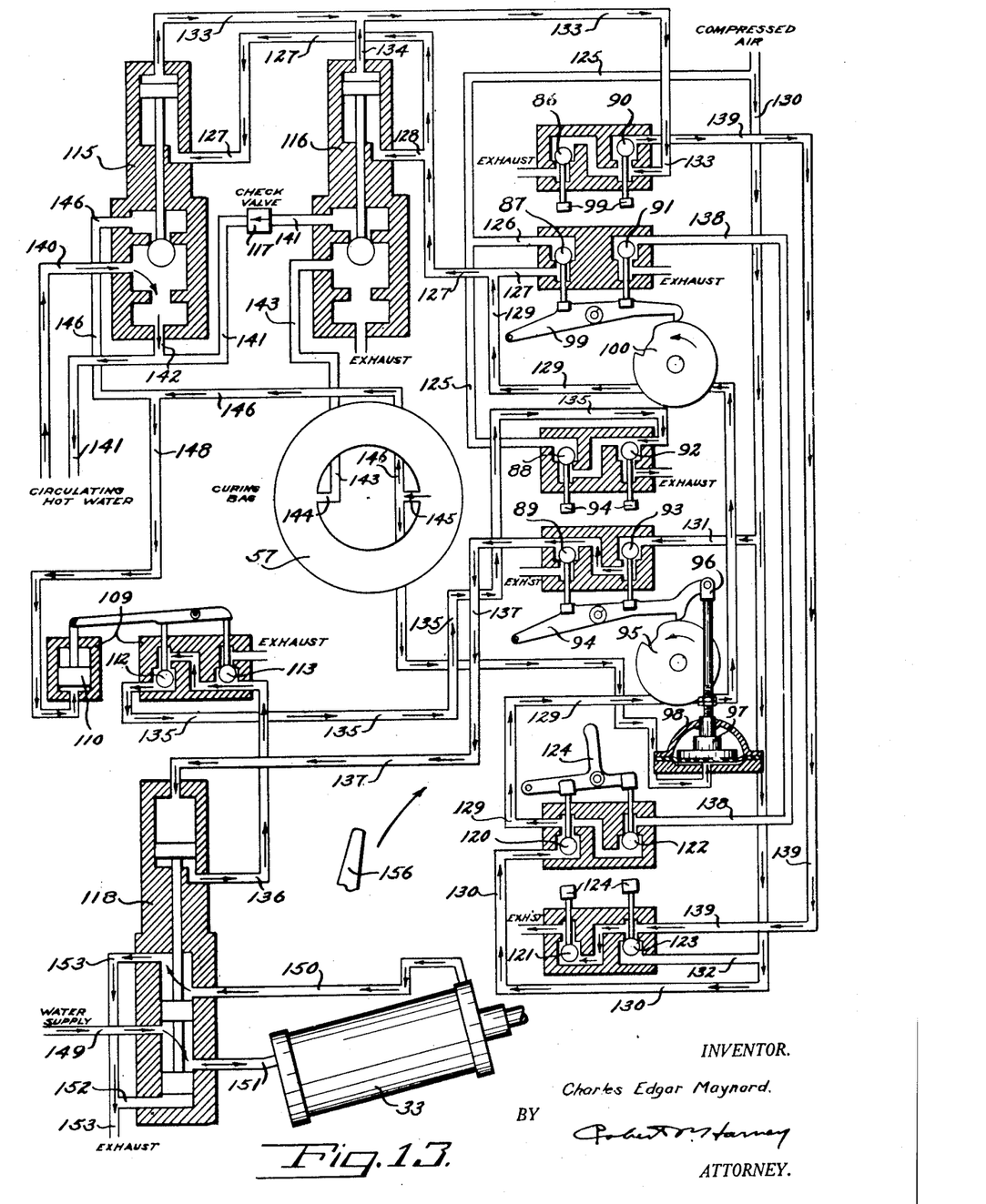
Figure 14:
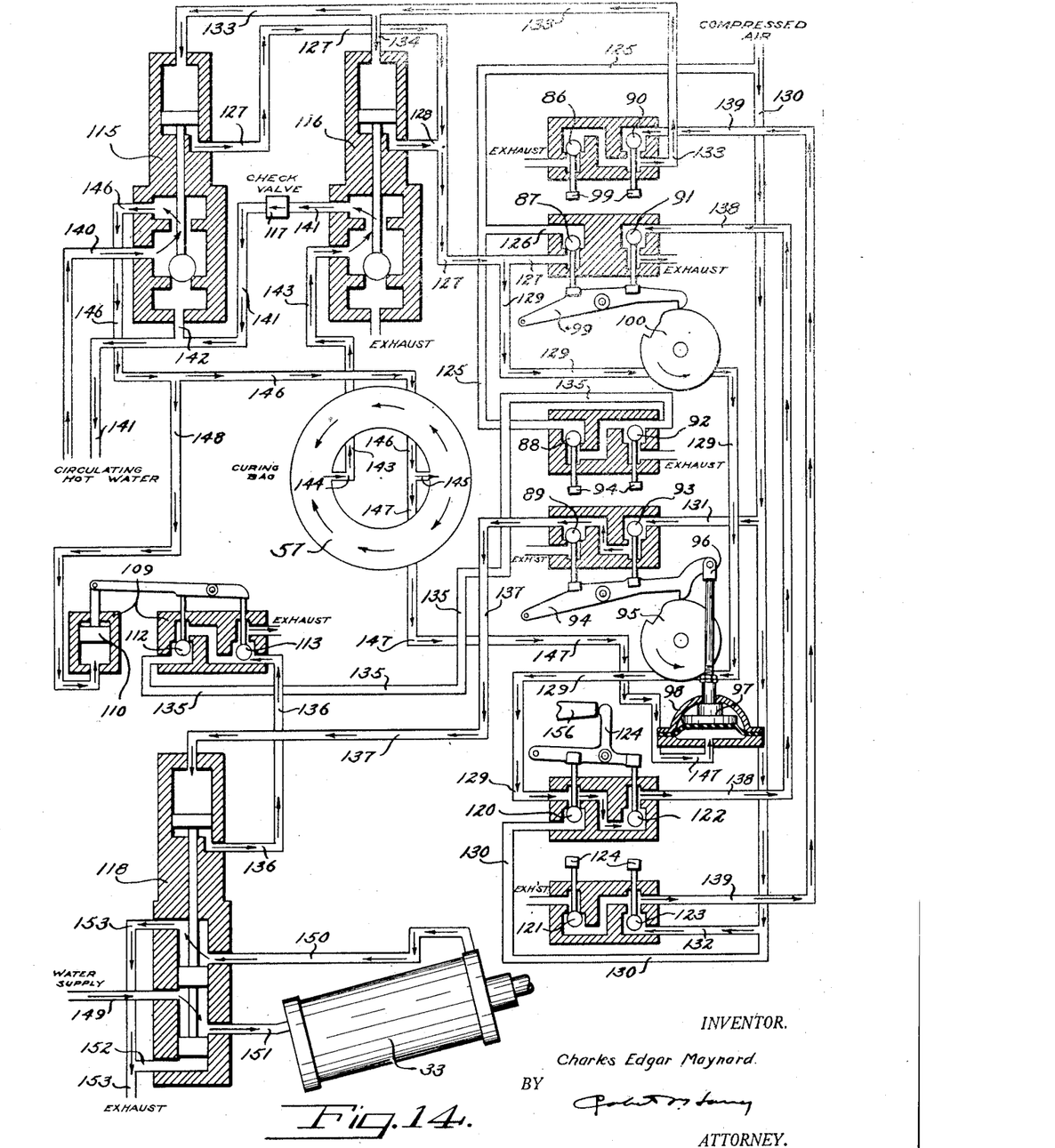

In order to vulcanize or cure a tire in my mold the operator simply has to place the casing and curing bag assembly on the bead ring portion 43, make the connections to the front and back of the curing bag and then pull the handle 103. The following vulcanizing operations of the mold are entirely automatic leaving the operator free to care for other molds, etc. When the handle 103 is pulled the cam arm 102 engages the pin clutch 101 to rotate the shaft 82 and cams 100, 95 and 81 a predetermined amount previously regulated by the setting of stop sleeve 104 and lock nuts 105. This rotation causes cam 81 to move the lever 80 from the pin 74 of the driving pawl 71 and cams 95 and 100 to pivot levers 94 and 99 which reverses the valves engaged by them. The position of the valves is then as shown in Fig. 13; valves 115 and 116 remain in the up position, but 127 and 128 receive air from 130, valve 120, and 129 while 133 and 134 open to exhaust through valve 90, 139 and valves 123 and 121. Valve 118 is operated to the down position by air from 130, 131, valves 93 and 89, and 137, while 136 is exhausted through valves 113 and 112, 135 and valve 92. This causes water to flow from 149 through valve 118 and 151 into the operating cylinder 33 and open 150 to exhaust through valve 118 and 153, thus causing the mold to close.

Just as the mold closes two things operate substantially simultaneously. The arm 32 engages the rod 78 causing the bell crank 73 to leave the pin 74 on the pawl 71 permitting the latter now free to engage the ratchet wheel 70, thus rotating the cams on shaft 82 through gears 83 and 84, and the arm 156 bolted to the toggle 35 engages the lever 124 and reverses the valves controlled by it to the positions shown in Fig. 14. Arm 156 is preferably positioned to operate lever 124 as or just after the toggle passes dead center. Valves 115 and 116 are brought to the down position by the admission of air through 130, 132, valve 123, 139, valve 90, 133 and 134 and opening 127 and 128 to exhaust through 129, valves 120 and 122, 138, and valve 91. The circulating hot water then goes from 140 through valve 115, 146 and 145 into the bag 99 and out through 144, 143, valve 116, check valve 117 and 141 to complete the circulation. Both the safety valve 109 and the diaphragm valve are now in the up position due to the pressure existing in the bag.

Figure 15:
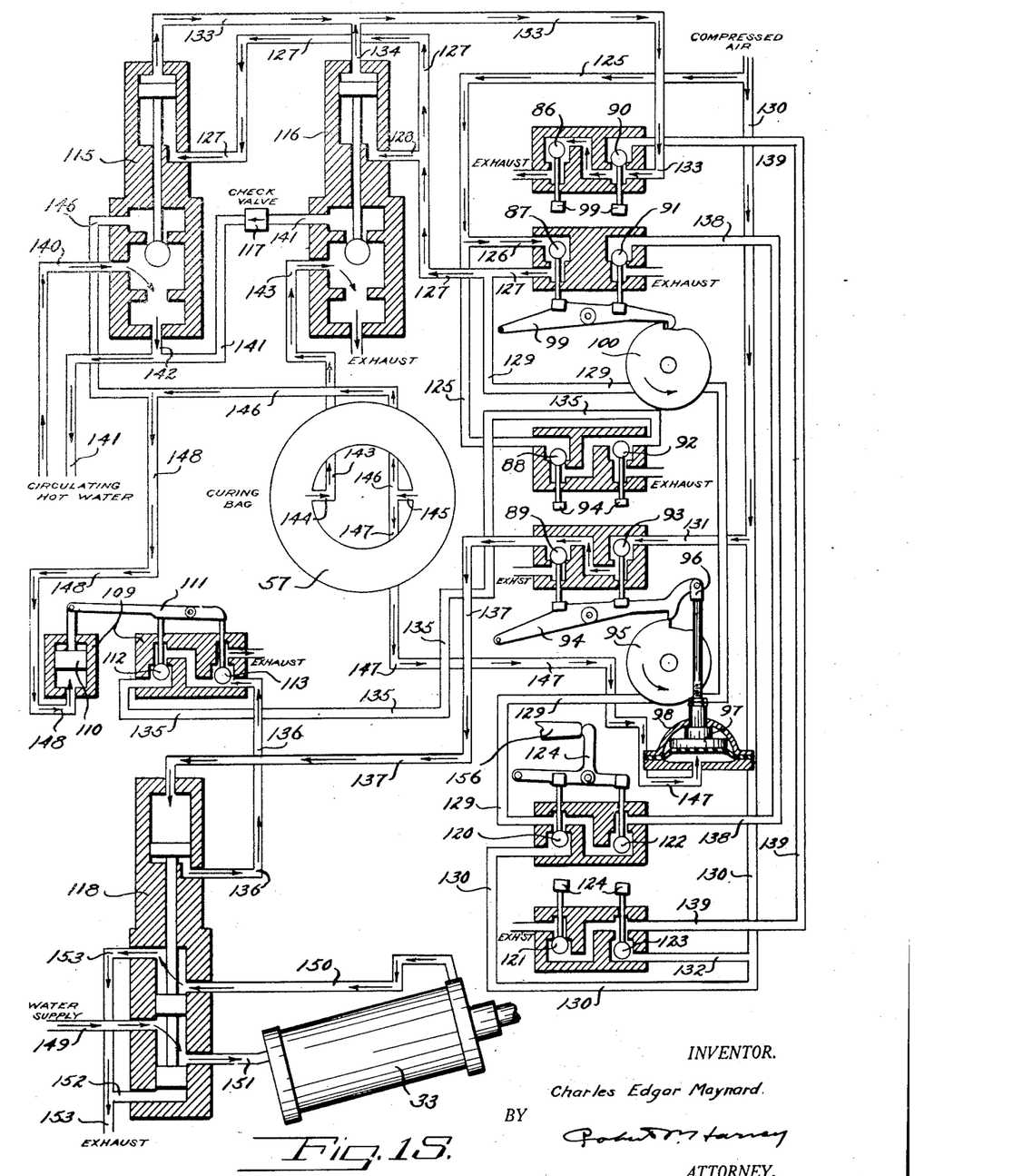

The curing then continues until the cams are rotated by the pawl 71 and ratchet wheel 70 to the position shown in Fig. 15, which shows cam 100 operating on lever 99 to reverse valves 86, 90, 87 and 91. This causes valves 115 and 116 to go to the up position by the admission of air through 127, 128, valve 87, 126 and 125 and exhausting 133 and 134 through valves 90 and 86. The circulating hot water then flows through 140, valve 115, 142 and back through 141 and the bag 57 is opened to exhaust 144, 143 and valve 116. The cams continue to rotate until cams 81 and 95 operate the levers 80 and 94 simultaneously to stop the pawl 71 from indexing the ratchet wheel 70 and to reverse the lever 94 and then all valves will return to the positions shown in Fig. 12 bringing the parts to the starting position again. If for any reason there is any pressure left in the bag 99 when the last cam action occurs the safety valve 109 and the diaphragm valve 98 will remain in the position shown in Fig. 15 regardless of the cams, and will retard the operating of the valves until all pressure is gone from inside the bag. Normally these safety devices are not brought into play as the cam 100 is made adjustable, as shown in Fig. 9, and may be set to operate enough ahead of the cams 81 and 95 so that the bag is emptied when the last mentioned cams operate.

To provide for various length cures the gears 83 and 84 are made accessible so that gears of different ratios may be used and this coarse adjustment in addition to the finer adjustment obtainable with the sleeve 104 and locking nuts 105 permits a wide range of cures. For convenience an indicating dial 154 may be fastened to the gear 84 to indicate the progress of the cure.

Having thus described my invention, I claim:

1. A vulcanizing mold for pneumatic tires comprising a stationary mold half positioned in a plane inclined to the horizontal, a movable mold half positioned below the stationary mold half and pivoted to swing upwardly into closed relation with the stationary mold half, a toggle mechanism to swing the movable mold half to and from closed position, and means to make and break the toggle.

2. A vulcanizing mold for pneumatic tires comprising a stationary mold half, a shaft spaced from said stationary mold half and connected thereto by tension members, means for adjusting the position of said stationary mold half with respect to said members, a movable mold half positioned between said shaft and the stationary mold half and pivoted to swing toward and from the stationary mold half, a toggle connection between the movable mold half and said shaft, and means to make and break the toggle to close and open the mold, said last named means being operative to move the toggle slightly past its dead center to lock the mold halves in closed relation.

3. A vulcanizing mold for pneumatic tires comprising two mold halves, at least one of said mold halves being movable with respect to the other and having its bead ring portion separable from the body of the mold half and connected thereto by a parallel link mechanism, and a stop member adapted to engage said link mechanism at a predetermined point in the movement of the mold half to separate the bead ring from the body of the mold half.

4. A vulcanizing mold for pneumatic tires comprising a stationary upper mold half and a lower mold half adapted to be moved toward and from the stationary upper mold half and having its bead ring portion separable from the body of the mold half and connected thereto by a parallel link mechanism, and a stop member adapted to engage said link mechanism at a predetermined point in the downward movement of the lower mold half to separate the bead ring from the body of the mold half.

5. A vulcanizing mold for pneumatic tires comprising separable mold members, means to open and close the mold, means to supply fluid pressure to the interior of the tire in the mold, means actuated by the mold closing means to admit the fluid pressure to the interior of the tire after the mold is closed, means to relieve the pressure in the tire a predetermined length of time after closure of the mold and means to inhibit the action of the mold opening means until the pressure within the tire is substantially relieved.

6. A vulcanizing mold for pneumatic tires comprising separable mold members, means to open and close the mold, means to supply fluid pressure to the interior of the tire in the mold, means actuated by the mold closing means to admit the fluid pressure to the tire after the mold is in closed position, means to relieve the pressure in the tire a predetermined length of time after closure of the mold, means normally operative immediately thereafter to actuate the mold opening means and means operable in the presence of substantial pressure in the tire to prevent the actuation of the mold opening means.

7. A vulcanizing mold for pneumatic tires comprising separable mold members, means to open and close the mold, a system in which a fluid under pressure circulates, a rotatable cam, valve mechanism controlled by said cam and operative during a predetermined portion of cam movement, but effective only subsequent to the closure of the mold, to include the interior of the tire being cured in said system, said cam operative thereafter to operate said valve mechanism to bipass the fluid pressure around the tire and to vent the tire.

8. A vulcanizing mold for pneumatic tires comprising separable mold members, an hydraulic pressure means for opening and closing the mold, a rotatable cam normally controlling the hydraulic pressure means, the initial movement of said cam being effective to cause the application of the hydraulic pressure to close the mold, the cam being operative during a predetermined portion of its movement to maintain the hydraulic pressure to hold the mold closed and to thereafter reverse the hydraulic pressure to open the mold, and pressure responsive means connected to the interior of the tire being vulcanized to prevent the reversal of the hydraulic pressure in response to the position of the cam if pressure is present in the interior of the tire.

9. A vulcanizing mold for pneumatic tires comprising separable mold members, an hydraulic pressure means for opening and closing the mold, a system in which fluid under pressure circulates, a rotatable cam normally controlling the hydraulic pressure means, the initial movement of said cam being effective to cause the application of the hydraulic pressure to close the mold, the cam being operative during a predetermined portion of its movement to maintain the hydraulic pressure to hold the mold closed and to thereafter reverse the hydraulic pressure to open the mold, a second rotatable cam, valve mechanism controlled by said second cam and operative during a predetermined portion of cam movement but effective only subsequent to the closure of the mold, to include the interior of the tire being cured in said system, said second cam operative after a predetermined period to bipass the fluid pressure around the tire and to vent the tire, and pressure responsive means connected to the interior of the tire and operative to prevent the reversal of the hydraulic pressure in response to the position of the first named cam if pressure is present in the interior of the tire.

10. A control device for a pneumatic tire vulcanizer comprising a continuously driven shaft, a cam shaft, clutch mechanism to connect the cam shaft to the driven shaft to cause a single revolution of the cam shaft, a cam on the cam shaft normally controlling the closing and opening of the mold, a second cam on said cam shaft normally controlling the admission of fluid pressure to the interior of the tire being vulcanized, means to prevent admission of fluid pressure to the interior of the tire unless and until the mold is closed and means to prevent opening of the mold if substantial pressure is present in the interior of the tire.

11. In a vulcanizer press for hollow articles, relatively movable mold sections, means for supplying pressure to the interior of the hollow article to cause it to properly fill the mold cavity, means for controlling the opening and closing of the press, and means interconnecting said opening and closing means and said pressure supplying means preventing the operation of the mold opening means as long as pressure is supplied to the interior of the hollow article and for automatically effecting the opening of the vulcanizer when said pressure in the article reaches a determinate minimum.

12. In apparatus of the character described, the combination with a treater chamber, mechanism for automatically closing and again opening the chamber according to a predetermined time schedule, and means for admitting pressure to the interior of the chamber, of means responsive to said pressure for holding the chamber against opening movement, including a vertically disposed cylinder, a piston therein having a rod extending upwardly out of the cylinder, a fluid pressure connection between the chamber and the lower end of the cylinder, means including a handle for manually setting the said mechanism into operation and means associated with said rod for locking said mechanism against operation when the rod is in its uppermost position and means to return the piston and rod to its lowermost position to release the locking means when the pressure in the chamber drops below a definite value.

13. In apparatus of the character described, the combination of a treater chamber, mechanism for automatically closing and again opening the chamber according to a predetermined time schedule, and means for admitting pressure to the interior of the chamber, of means responsive to said pressure for holding the chamber against opening movement, including a vertically disposed cylinder, a piston therein having a rod extending upwardly out of the cylinder, a fluid pressure connection between the chamber and the lower end of the cylinder, means including a handle for manually setting the said mechanism into operation and means connected with the said rod for locking said mechanism against operation, comprising a lever having angular movement and bearing near one end a cross-pin forming a pivotal connection between the lever and the rod, a valve actuated by movement of said lever adapted to lock said mechanism against operation, the relation of said rod, lever, and valve being such that the said valve is normally maintained in locking position when the piston is in its upper position but is moved to permit operation of said mechanism when the piston is in its lower position.

14. An arrangement of the character described, the combination with apparatus having an operating movement, of time-controlled mechanism for determining a cycle of operating movement of said apparatus, means for manually initiating the operating movement of the apparatus, means movable in response to the initial movement of the apparatus for starting the said time-controlled mechanism and means operative in the course of the cycle of operation to bring the said responsive means back to its original position.

15. In apparatus of the character described, the combination with a treater chamber and mechanism for closing and then again opening the chamber, of time-controlled mechanism operative to determine the period during which the chamber remains closed, means for manually initiating the movement of said mechanism for closing the chamber, means movable in response to said closing movement for starting the time-controlled mechanism, and means operative in the course of the cycle of operation to bring said starting means back to its original position.

16. In apparatus of the character described, the combination with a treater chamber, mechanism for closing and then again opening the chamber, a source of pressure fluid connected with the chamber, of time-controlled means operative to determine the period during which the chamber remains closed, means for manually initiating the movement of said mechanism for closing the chamber, means movable in response to said closing movement for starting the time-controlled means, pressure-responsive means in connection with the chamber for locking the same against opening movement while the pressure therein exceeds a certain limit, and means operative in response to the degree of pressure acting on said pressure-responsive means for resetting the starting means to its original position.

17. In apparatus of the character described, the combination with a treater chamber, mechanism for closing and opening the chamber, a source of pressure fluid connected with the chamber, time-controlled means operative to determine the period during which the chamber remains closed, and normally operative to cause said mechanism to open said chamber, means for manually initiating the movement of said mechanism for closing the chamber, means operable in response to said closing movement for starting the time-controlled means, and pressure-responsive means in connection with the chamber for locking the chamber against opening movement while the pressure therein exceeds a certain limit.

18. In apparatus of the character described, the combination with a treater chamber, mechanism for closing and opening the chamber, a source of pressure fluid connected with the chamber, time controlled means, including an electrical motor, operative to determine the period during which the chamber remains closed and normally operative to cause such mechanism to open the chamber, means for manually initiating the movement of said mechanism for closing the chamber, energizing means operative upon the operation of said mechanism for starting the time controlled means, means actuated by the time controlled means to stop the time controlled means upon the completion of one cycle, and pressure-responsive means in connection with the chamber for locking the same against opening movement while the pressure therein exceeds a certain limit.

19. In apparatus of the character described, the combination with a treater chamber, mechanism for closing and opening the chamber, a source of pressure fluid connected with the chamber, a time controlled means including a driven shaft operative to determine the period during which the chamber remains closed and normally operative to cause said mechanism to open said chamber, means for driving said shaft, means for manually initiating the movement of said mechanism for closing the chamber, energizing means actuated in response to the closing of said chamber for starting the time controlled means, means actuated by the time controlled means independently of said energizing means to stop the time controlled means upon the completion of one cycle, and pressure responsive means in connection with the chamber for locking the same against opening movement while the pressure therein exceeds a certain limit.

20. In apparatus of the character described, the combination with a treater chamber, mechanism for closing and opening the chamber, a source of pressure fluid connected with the chamber, time controlled means including a driven shaft operative to determine the period during which the chamber remains closed, means for driving said shaft, means for manually initiating the movement of said mechanism for closing the chamber, energizing means actuated in response to the closing of said chamber for starting the time controlled means, means actuated by said time controlled means independently of said energizing means to stop the time controlled means upon the completion of one cycle, pressure-responsive means in connection with the chamber for locking the same against opening movement while the pressure therein exceeds a certain limit, and means for returning said energizing means to initial position prior to the return of the chamber to its initial open position.

21. In a vulcanizer comprising separable sections, a lever for starting the initial operation and closing of the sections, means for manually actuating said lever, means releasably preventing manual operation of said lever and power means for causing operative movement of said lever to open the vulcanizer sections.

22. A vulcanizing mold for pneumatic tires comprising separable mold members, means to open and close the mold, means to supply fluid pressure to the interior of the tire in the mold, means actuated by the mold closing means to admit the fluid pressure to the interior of the tire, said mold closing means acting to close the mold before substantial pressure is built up in the tire, means to relieve the pressure in the tire a predetermined length of time after closure of the mold and means to inhibit the action of the mold opening means until the pressure within the tire is substantially relieved.

23. A vulcanizing mold for pneumatic tires comprising separable mold members, means to open and close the mold, means to supply fluid pressure to the interior of the tire in the mold, means actuated by the mold closing means to admit the fluid pressure to the tire, said mold closing means acting to close the mold before substantial pressure is built up in the tire, means to relieve the pressure in the tire a predetermined length of time after closure of the mold, means normally operative immediately thereafter to actuate the mold opening means and means operable in the presence of substantial pressure in the tire to prevent the actuation of the mold opening means.

24. A vulcanizing mold for pneumatic tires comprising separable mold members, means to open and close the mold, a system in which a fluid under pressure may circulate, a rotatable cam, valve mechanism controlled by said cam and operative during a predetermined portion of cam movement to include the interior of the tire being cured in said system, said mold closing means acting to close the mold before substantial pressure is built up in the tire, said cam operative thereafter to operate said valve mechanism, to cut off the fluid pressure from the tire and to vent the tire.

25. In apparatus of the character described the combination of a treater chamber, a time-cycle regulator, means for energizing the same, a primary means operated in response to the operation of said treater chamber for making the energizing means effective, a secondary means operably connected with the time-cycle regulator for rendering the energizing means ineffective at the end of one time-cycle of the regulator, and means for placing the primary means in condition to again be operated by a subsequent operation of the treater chamber.

26. In apparatus of the character described, the combination with a treater chamber, means for closing and re-opening the chamber and means for manually initiating the closing movement of said means, of a time-cycle regulator for determining the period during which the chamber remains closed, means for driving the regulator, a primary means movable in response to said closing movement for making the driving means effective, a secondary means operative in response to the movement of the regulator for rendering the driving means ineffective independently of the said primary means, and means for resetting the primary means for reactuation by the succeeding chamber closing movement.

27. A vulcanizing mold for pneumatic tires and the like which comprises, separable mold members, fluid pressure means to open and close the mold, means to supply fluid pressure to the interior of the tire being vulcanized, fluid pressure means to control said supply means, means to manually actuate said first fluid pressure means to close the mold, a time controlled means actuated by the closing of the mold and operable to actuate said second fluid pressure means to admit fluid pressure to the interior of the tire and thereafter to vent said tire, and means normally operative upon completion of one cycle of operation of the time controlled means to automatically open the mold if and when the pressure within the tire has been substantially relieved.

28. In apparatus of the character described, the combination of a treater chamber, mechanism for closing and opening the chamber, a source of pressure fluid connected with the chamber, said mechanism including a cylinder and piston, valve mechanism connected to said cylinder for controlling the chamber closing and opening movements of said piston, an actuating valve mechanism operable to effect operation of said cylinder valve mechanism, manual means to initially set said actuating valve mechanism to cause the chamber to be closed, time controlled means operative to determine the period during which the chamber remains closed and normally operative to cause said mechanism to open the chamber, means responsive to the chamber closing movement of said mechanism to start the time controlled means, and pressure responsive means in connection with the chamber for holding said actuating valve mechanism in chamber closing position so long as the pressure in said chamber exceeds a certain limit.

29. In apparatus of the character described the combination of a treater chamber, mechanism for closing and opening said chamber including a cylinder, a fluid pressure operated piston within the cylinder, valves connected to said cylinder to control the movements of said piston, fluid pressure means to actuate said cylinder valves, a control valve mechanism operable to actuate said fluid pressure means, manual means for actuating said control valve to effect chamber closing movement of said mechanism, a source of fluid pressure connected with the chamber, valves adapted in one position to admit fluid pressure to the chamber and in another position to vent said chamber, fluid pressure means to actuate said last named valves, valve mechanism controlling said last named fluid pressure means, a shaft, means to drive said shaft through a single revolution, means responsive to the closing movement of said chamber closing and opening mechanism to start said shaft driving mechanism, cam means carried by said shaft and operative to successively admit fluid pressure to the chamber and vent the chamber, pressure-responsive means including a vertically movable piston adapted to be held in raised position by the pressure in the chamber, a pivoted lever operably connected to said first mentioned control valve mechanism and means connecting said lever and vertically movable piston to prevent chamber opening movement of said first control valve mechanism as long as the pressure in the chamber and pressure-responsive means exceeds a certain limit sufficient to hold the piston in raised position and means to move said first control valve to chamber opening position upon downward movement of the piston.

CHARLES EDGAR MAYNARD.